United States Patent [19]
Despres

[11] Patent Number: 4,741,651
[45] Date of Patent: May 3, 1988

[54] HOLE SAW

[76] Inventor: Roger J. Despres, 9630 El Rey Ave., No. 13, Fountain Valley, Calif. 92708

[21] Appl. No.: 855,949

[22] Filed: Apr. 25, 1986

[51] Int. Cl.$^4$ .............................................. B23B 31/04
[52] U.S. Cl. ...................................... 408/209; 125/20; 144/23; 408/204; 408/703
[58] Field of Search ................... 408/68, 86, 118, 204, 408/205, 206, 207, 208, 209; 144/20, 23; 125/20

[56] References Cited

U.S. PATENT DOCUMENTS

| | | | |
|---|---|---|---|
| 1,596,197 | 8/1926 | Lindgren | 408/206 |
| 3,390,596 | 7/1968 | Trevathan | 408/68 |
| 3,647,310 | 3/1972 | Morse | 408/209 X |
| 3,648,508 | 3/1972 | Hougen | 408/204 X |
| 3,758,221 | 9/1973 | Meshulam | 144/23 X |
| 3,837,759 | 9/1974 | Bihern | 144/23 X |
| 3,854,840 | 12/1974 | Miyanga | 144/23 X |
| 4,422,811 | 12/1983 | Ellison et al. | 408/204 |

Primary Examiner—Gil Weidenfeld
Assistant Examiner—Glenn L. Webb
Attorney, Agent, or Firm—Roy A. Ekstrand

[57] ABSTRACT

An improved hole saw is disclosed. A mandrel of the hole saw forms an elongated threaded body. The mandrel, at a first end forms a shank adapted to be secured in the chuck of a hand power drill or drill press. The second end of the mandrel forms an enlarged, radially extended, circular flange having a recessed axially aligned hole formed therein. The shank end of, for example, a quarter inch pilot-hole drill is secured in the flanged end of the mandrel by one or more set screws. The mandrel is inserted, shank end first, into the open serrated cutting end of a cylindrically shaped hole saw. The threaded shank end of the mandrel is screwed into a threaded base of the hole saw, the radially extended flange of the mandrel being mated to and tightened against the inside base end of the hole saw. By inserting the mandrel through the cutting end of the hole saw and threading it tightly against the base of the saw, it now is convenient to remove sawn plugs contained by the cylindrical hole saw by simply threading the mandrel back out of the hole saw towards the circular cutting end of the saw. A left-hand threaded mandrel and hole saw base will assure that the mandrel will remain secured within the hole saw during use.

11 Claims, 1 Drawing Sheet

HOLE SAW

BACKGROUND OF THE INVENTION

1. Field of the Invention

This invention is related to hole saws having a common mandrel adapted to be used with different diameters of hole saws.

More particularly, this invention discloses a means to more easily remove the plug of material jammed into the interior of a hole saw after the saw has cut the hole.

2. Description of the Prior Art

Various diameter hole saws that utilize a single-pilot, drill-containing mandrel—the mandrel being switched from one size to another size hole saw—are well known in the art.

For example, a typical hole saw consists of a cylindrical saw that forms a heavy base end with a threaded axially aligned hole in the bore. A threaded mandrel is adapted to screw into the base of the hole saw from the outside or base end of the saw. The mandrel at its threaded end forms a hole to accept the shank of a drill, the opposite end of the mandrel forming a shank designed to be received by the chuck of a drill motor or the like. Intermediate the threaded end and the shank of the mandrel is a flange formed typically in a hex-nut shape for securing the mandrel in the base of the hole saw. A set screw between the flange and the shank of the mandrel secures the shank of the pilot drill positioned in the hole formed in the threaded end of the mandrel.

A right-hand thread is normally used to secure the mandrel and the hole saw. In use then, when the serrated end of the saw contacts the surface of the material to be sawn, a reactive force between the hole saw and the mandrel tends to loosen the mandrel from the hole saw if the mandrel is not unusually tight against the base of the hole saw. After the saw cuts the hole, the plug of material then must be removed from the interior of the hole saw. Slots are normally formed by the hole-saw body so that the plug may be pried out of the saw, a tedious task at best.

Another well known hole saw utilizes a slightly different configuration. The single mandrel for the various diameter hole saws consists of a mandrel body having a first flanged base end and a second, smaller-diameter, threaded end—the mandrel further forming an axially aligned hole therethrough adapted to accept a drill bit. The shank of the drill bit has flats to accept a set screw retained in the mandrel flange to secure the drill in the mandrel. The shank end of the drill is used to secure the hole saw in a drill motor as heretofore described. The flange of the mandrel is stepped down in diameter, forming a circular shoulder at its base, the intermediate flange being formed with flats that conform to complimentary flats formed in the base of the hole saw. The drill-containing mandrel then is inserted through the open serrated end of the hole saw, the intermediate flange flats being aligned with the flats of the hole saw to prevent rotation of the mandrel with respect to the hole saw. A threaded nut then is slipped over the shank of the drill and tightened into the threaded end of the mandrel protruding through the base of the hole saw, thereby securing the hole saw between the mandrel and the nut.

Again, since a right-hand thread is used, slight movement between the hole saw and the mandrel will easily loosen the nut when the cutting end of the hole saw contacts the surface to be cut.

To remove the plug of material from the interior of the hole saw, the hole saw must be removed from, for example, the power drill. The nut is then removed from the mandrel, followed by forcibly driving the mandrel and plug out of the open end of the hole saw.

As an alternative, holes formed in the circular side wall of the saw enable the plug of material to be pried or split out of the mandrel, as previously described.

Some state-of-the-art hole saws utilize a washer and spring arrangement internally of the hole saw to urge the plug of material from the hole saw after the saw has completed its cut.

The present invention overcomes the obvious deficiencies of the foregoing prior art by providing a means to easily remove a plug of material from the interior of a hole saw. This is accomplished without utilizing knives or picks or complete dismantling of the apparatus of the hole saw.

Additionally, the instant invention provides a means to prevent loosening of the hole saw from its mandrel during operation of the saw.

SUMMARY OF THE INVENTION

It is an object of this invention to provide a means to easily remove a plug of material from the interior of a hole saw.

More specifically, it is an object of this invention to provide an elongated threaded mandrel adapted to be threaded into the open cutting end of a hole saw, a flange of the mandrel serving to drive out a plug of material jammed into the interior of the hole saw when the mandrel is backed out of its threaded receptacle at the base of the hole saw.

A hole-saw apparatus of the present invention consists of an open-ended, circular, hole-saw body that forms a first cutting end and a second base end. Walls of the hole saw formed between the base and the cutting end of the body confine an interior thereby. An axially aligned, threaded hole is formed in the second base end of the hole-saw body. A mandrel is inserted through the open cutting end of the hole-saw body. The mandrel forms a flange portion intermediate a pilot drill and a shank portion. An elongated threaded portion of the mandrel is smaller in diameter than the flange and is positioned between the flange and the shank of the mandrel. The mandrel is threaded into the threaded second base end of the hole-saw body by inserting the mandrel first through the open cutting end of the hole saw. The flange portion of the mandrel is tightened against the base of the hole saw prior to operation of the apparatus. A plug of material jammed between the flange and the walls forming the interior of the hole saw after a hole is cut in the material is removed from the interior by simply threading the mandrel out of the threaded base of the hole saw. The mandrel flange then drives the plug from the hole-saw body.

By utilizing a left-hand thread on the mandrel and base of the hole saw, a clockwise turn of, for example, a drill motor will tighten rather than loosen the mandrel within the hole saw when the cutting end of the saw contacts the material to be sawn.

An advantage then of the present invention over the prior art is the method by which a plug of material is removed from the interior of a hole saw after use.

Yet another advantage of the instant invention over the prior art is the use of a left-hand thread to retain the mandrel within a hole-saw body. The left-hand thread will tighten rather than loosen the mandrel threaded into the hole saw in a typically clockwise-rotating, conventional, power hand drill and the like.

The above-noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
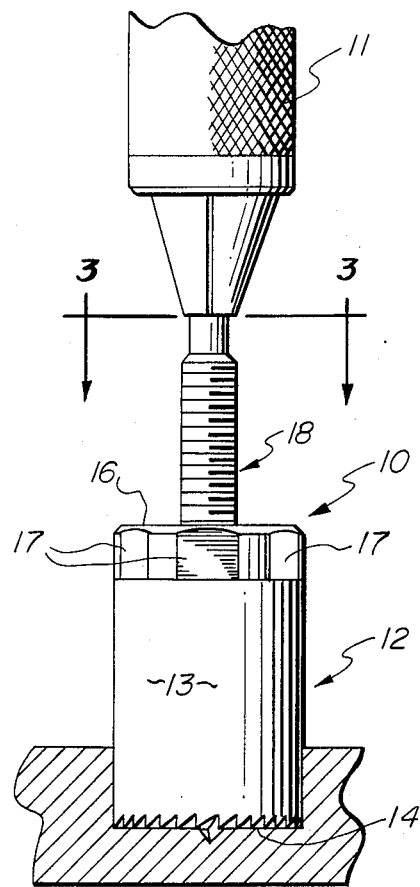
FIG. 1 is a partially cut away view of a hole saw cutting part way through a material, the shank of the mandrel of the hole saw being retained within the chuck of a drill motor.
Figure 2:
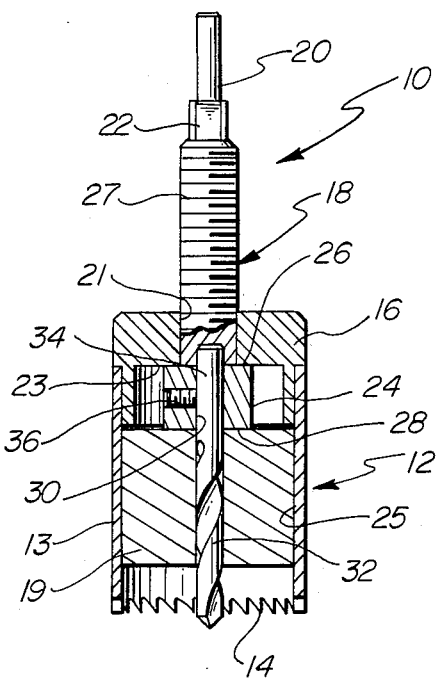
FIG. 2 is a partial cross-section of the hole saw with the flange of the threaded mandrel tightened against the base of the hole saw, a plug of sawn material being wedged within the interior of the hole saw.
Figure 3:
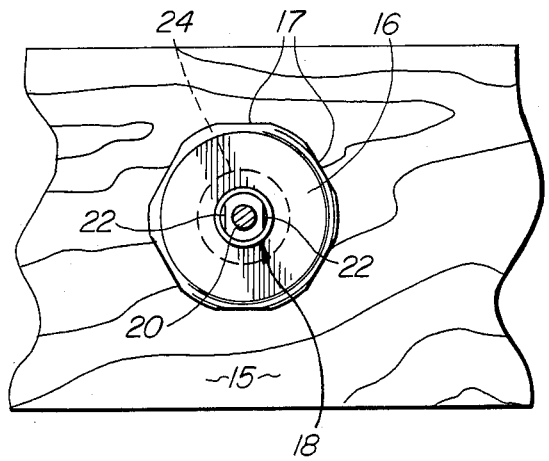
FIG. 3 is a view taken through 3—3 of FIG. 1, looking down on the base end of the hole saw.

With reference to FIGS. 1, 2 and 3, the hole saw, generally designated as 10, consists of hole-saw body 12, serrated cutting end 14, and base 16. Threaded to hole-saw body 12 is a threaded mandrel, generally designated as 18, which forms a shank 20 adapted to be received by a chuck 11 of, for example, a power drill or drill press (not shown). The shank transitions into an enlarged segment having wrench flats 22 formed therein, the purpose of which will be explained further on into the specification. The mandrel 18 then forms an elongated threaded shaft 27 that threads into complimentary threads 21 in base 16. The elongated shaft 27 terminates at a flange 24 that is an integral part of the mandrel 18. The flange 24 forms an inside radially disposed shoulder 26 that mates with surface 23 of base 16 of hole saw 12.

The flange 24 further forms an axially oriented hole 30 adapted to receive the shank 34 of a drill bit 32. Typically, the drill bit is one-quarter inch in diameter. The shank is held in place within hole 30 by at least one and preferably three set screws 36 radially disposed in flange 24 of mandrel 18.

The threads 27 and 21 formed in mandrel 18 and base 16 are preferably left-hand threads. Thirteen threads per half inch of the shank and base is the preferred arrangement, although other thread parameters may be utilized without departing from the intent of this invention.

By using left-hand threads on the assembly of the mandrel 18 to the hole-saw body 12, clockwise rotation of a hand power drill (a standard rotation of all hand power drills and drill presses) will assure that the mandrel will not be loosened when the cutting end 14 contacts the surface of the material 15 to be cut. The threaded shank 27 is of a sufficient length to completely remove a plug of material from the interior of the hole saw 12 while the end of the shank 27 is still engaged with threaded bore 16.

After the material 15 is cut (FIG. 1), the plug 19 (FIG. 2) becomes wedged or jammed between the inside wall surface 25 of body 12, the radial outside shoulder 28 of flange 24, and the surface of the fluted pilot drill 32.

Figure 4:
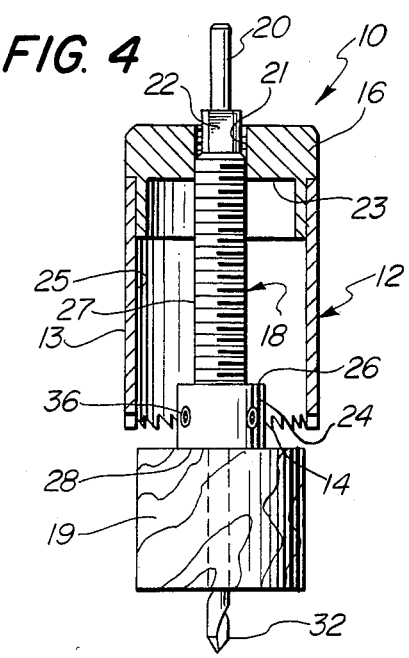
FIG. 4 is a partially sectioned hole saw, the threaded mandrel of which is backed away from the base of the hole saw, thereby forcing the jammed sawn material in the interior of the hole saw out of the saw.

With reference now to FIGS. 3 and 4, to remove the plug of material 19 from the saw body 12, for example, the flats 17 of base 16 and flats 22 adjacent shank 20 are engaged with a pair of wrenches (not shown) to initially break the tightened flange 24 from base 16. The drill motor then may subsequently be reversed while holding the loosened saw body 12 from rotation by one of the wrenches, thereby locking the mandrel 18 out of base 16 and forcing the plug 19 from the interior of the saw 12.

The invention, therefore, positively solves the age-old problem of removing a stubbornly adhering plug from the inside of a hole saw.

It would be obvious to use the mandrel 18 with different diameters and shapes of hole cutters, although cylindrical cutters are illustrated, without departing from this invention (not shown).

It would also be obvious to form the mandrel integral with a drill bit, thereby eliminating the series of set screws that retain the bit 32 in flange 24, without departing from the scope of this invention (not shown).

It will, of course, be realized that various modifications can be made in the design and operation of the present invention without departing from the spirit thereof. Thus, while the principal preferred construction and mode of operation of the invention have been explained in what is now considered to represent its best embodiments which have been illustrated and described, it should be understood that within the scope of the appended claims the invention may be practiced otherwise than as specifically illustrated and described.

What is claimed is:

1. A hole-saw apparatus comprising:
   an open-ended, substantially circular hole-saw body forming an open cutting end and a base end, said body further forming walls between said base end and said open cutting end forming an interior therein, said base end defining an axially aligned left hand threaded hole therethrough; and
   a mandrel defining first and second ends adapted to be inserted through said open-ended circular body, said mandrel forming a pilot drill at said first which transitions into a flange and a shank portion at said second end and an elongated left hand threaded portion, intermediate said flange and said shank portion, said elongated left hand threaded portion being smaller in diameter than said flange and said mandrel being threaded into said left hand threaded axially aligned hole in said base end of said open-ended body such that said flange of said mandrel is tightened against said base end of said circular hole-saw prior to operation of said hole-saw apparatus said left hand threaded hole and said left hand threaded portion cooperating to remove a plug of material jammed between said flange and said walls forming said interior of said hole-saw after said hole is cut in said material by threading said mandrel out of said left hand threaded hole in said base of said hole-saw body causing said mandrel flange to drive the plug of material from said hole-saw body.

2. The invention as set forth in claim 1 further comprising an axially aligned hole formed in said flange portion adapted to receive a shank end of a pilot drill, said shank of said drill being secured within said flange by at least one set screw radially retained within a complimentary, radially disposed, threaded hole formed in said flange.

3. The invention as set forth in claim 2 wherein three set screws are retained within complimentary, radially disposed, threaded holes formed in said flange and positioned substantially 120° apart, thereby securing said shank of said drill within said flange portion.

4. The invention as set forth in claim 1 wherein said open ended, circular, hole-saw body is substantially cylindrical in shape.

5. The invention as set forth in claim 4 wherein said cutting end of said cylindrical hole saw is serrated.

6. The invention as set forth in claim 1 wherein said mandrel is adapted for use with hole saws of different diameters.

7. A method of assembling a pilot drill containing a left hand threaded mandrel into a hole saw to enable a plug of material to be removed from an interior of said hole saw, comprising the steps of:
   inserting a shank end of said left hand threaded mandrel through an open cutting end of said hole saw;
   threading said mandrel into complimentary left hand threads formed in a base of said hole saw;
   tightening said mandrel against said base end of said hole saw, a flange formed by said mandrel between said pilot drill and said shank end seats against said base of said hole saw; and
   disengaging said mandrel from said base of said hole saw and threading said mandrel out of said base, thereby subsequently removing said plug of previously cut material jammed into said interior of said hole saw therefrom.

8. The method as set forth in claim 7 further comprising the step of forming complimentary left-hand threads in said mandrel and said base of said hole saw, thereby preventing said mandrel from becoming disengaged from said hole saw when a cutting edge of a clockwise-turning hole saw contacts the surface of a material to be cut.

9. The method as set forth in claim 7 further comprising the step of elongating the threaded portion of said mandrel a sufficient length to completely extract said plug of material from the interior of said hole saw while said threaded mandrel is still engaged with the threads formed in said base of said hole saw.

10. A hole-saw apparatus comprising:
   an open-ended substantially circular hole-saw body forming an open cutting end having a plurality of teeth for cutting in a first direction of rotation and a base end, said body further forming walls between said base end and said open cutting end forming an interior therein, said base end defining an axially aligned aperture defining internal threads therethrough advancing in a second direction of rotation opposite to said first direction and
   a mandrel defining first and second ends adapted to be inserted through said open-ended circular body, said mandrel forming a pilot drill at said first which transitions into a flange and a shank portion at said second end and an elongated externally threaded portion, intermediate said flange and said shank portion, said elongated threaded portion being threaded in the same size and direction as said axially aligned aperture and threaded into said threaded axially aligned hole in said base end of said open-ended body such that said flange of said mandrel is tightened against said base end of said circular hole-saw by rotation of said mandrel in said first direction of rotation and is driven away from said base end by rotation of said mandrel in said second direction to remove a plug of material jammed between said flange and said walls forming said interior of said hole-saw after said hole is cut in said material.

11. The invention as set forth in claim 10, wherein a left-hand thread is formed in said threaded portion of said mandrel and in said second base end of said circular hole saw to prevent dislodgement of said hole saw from said mandrel when a clockwise rotation of said cutting end of said hole saw contacts a surface of a material to be cut.

* * * * *